United States Patent [19]

May et al.

[11] Patent Number: 4,666,623
[45] Date of Patent: May 19, 1987

[54] GRANULAR AMINOMETHYLENEPHOSPHONATE

[75] Inventors: Bronislav H. May, Overijse; Hubert H. Nijs, Louvain; Brigitte M. J. Vandenbulcke, Chaumont-Gistoux, all of Belgium

[73] Assignee: Monsanto Europe S.A., Brussels, Belgium

[21] Appl. No.: 832,286

[22] Filed: Feb. 21, 1986

[30] Foreign Application Priority Data

Feb. 21, 1985 [GB] United Kingdom .............. 8504489

[51] Int. Cl.⁴ .................. C11D 3/12; C11D 3/39; C11D 7/36
[52] U.S. Cl. ..................... 252/102; 252/95; 252/131; 252/140; 252/155; 252/174.13; 252/174.25; 252/545; 252/174.16; 252/DIG. 17; 428/403
[58] Field of Search .............. 252/545, 546, 174.13, 252/174.25, 140, 102, 131, 174.16, DIG. 17, 181, 95, 155; 428/403

[56] References Cited

U.S. PATENT DOCUMENTS

| | | |
|---|---|---|
| 4,072,622 | 2/1978 | Kühling et al. .............. 252/179 |
| 4,231,887 | 11/1980 | Denny et al. ............... 252/174.19 |
| 4,392,974 | 7/1983 | Hachmann et al. ........... 252/99 |
| 4,552,681 | 11/1985 | Koch et al. ................ 252/140 |

FOREIGN PATENT DOCUMENTS

| | | |
|---|---|---|
| 1853 | 5/1979 | European Pat. Off. . |
| 2544035 | 4/1976 | Fed. Rep. of Germany . |
| 3132767 | 3/1983 | Fed. Rep. of Germany . |
| 3248022 | 6/1984 | Fed. Rep. of Germany . |

*Primary Examiner*—Prince E. Willis
*Attorney, Agent, or Firm*—R. C. Loyer

[57] ABSTRACT

Aminomethylenephosphonate-coated granules of substantially water-insoluble silicate having improved stability in the presence of peroxygen compounds. Such coatings can comprise alkali metal aminomethylenephosphonate of the formula:

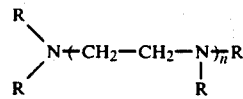

where each R is H, $CH_2PO_3H_2$ or $CH_2PO_3HM$ or $CH_2PO_3M_2$; where M is an alkali metal; and n is 0 or an integer, preferably an integer of from 1 to 4. The coatings are substantially free of peroxygen compounds and peroxy compound precursors.

16 Claims, No Drawings

GRANULAR AMINOMETHYLENEPHOSPHONATE

This invention relates to stabilized aminomethylenephosphonate compositions in the form of powder or granules.

Various aminomethylenephosphonic acids and their water-soluble salts are known materials having a variety of uses including stabilization of peroxygen compounds, e.g. by chelation of heavy metals such as iron or copper which can activate peroxides, and inhibition of scale in water-treatment processes.

Certain of the aminomethylenephosphonic acids are stable solids, but for many applications their alkali metal salts (in which some or all of the acidic hydrogen atoms of the phosphonic acid are replaced by alkali metal ions) are more suitable. Such alkali metal salts are not, in isolation, stable solids, being highly hygroscopic or deliquescent and they are therefore sold as aqueous solutions. For certain uses, e.g. as components of dry detergent compositions, a powder or granular form of such salts would be advantageous. Moreover, the aminomethylenephosphonates are generally adversely affected, i.e. oxidized, by peroxygen compounds. Thus, the presence in the compositions of the invention of peroxygen materials which tend to generate such an environment is undesirable.

SUMMARY OF THE INVENTION

An object of this invention is to provide a granular form of aminomethylenephosphonate, e.g. as an alkali metal salt, which is resistant to oxidation by peroxygen compounds.

This and other objects of this invention are provided by aminomethylenephosphonate-coated granules of a substantially water-insoluble silicate. Dry detergent formulations comprising such granules are also provided.

DESCRIPTION OF THE PREFERRED EMBODIMENTS

In certain aspects of this invention such coating consists essentially of alkali metal salts of aminomethylenephosphonic acid, e.g. of the formula:

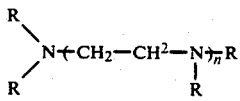

where each R is H, $CH_2PO_3H_2$, $CH_2PO_3HM$ or $CH_2PO_3M_2$; where M is an alkali metal; and n is 0 or an integer, preferably an integer of from 1 to 4. The water-insoluble silicate granules can be a silicate or aluminosilicate, preferably having a layered sheet structure. The coating is preferably substantially free of peroxygen compounds and peroxy compound precursors.

Preferred aminomethylenephosphonates for use in the coating of the granules of the present invention are the alkali metal salts, especially the sodium salts, of ethylenediaminetetra(methylenephosphonic acid) and of diethylenetriaminepenta(methylenephosphonic acid), and mixtures thereof. The alkali metal salts can be made from the corresponding acids by neutralization, or partial neutralization, with alkali metal hydroxides. It is generally desirable for many uses of the granules of this invention, e.g. in dry detergents, that the pH of the granules (e.g. in water) be neutral or only slightly acidic. Generally more than half, or an average of more than half, of the R groups are mono- or di-alkali salts of methylenephosphonic acid.

The commercially available aminomethylenephosphonic acids are usually mixtures having different numbers of (methylenephosphonic acid) groups. Thus the major components of sodium salts prepared from a commercial ethylenediaminepoly(methylenephosphonic acid) are compounds in which the four R groups in the above formula are all $CH_2PO_3Na_2$ or $CH_2PO_3HNa$; but the compounds in which three or two R groups are $CH_2PO_3Na_2$ or $CH_2PO_3HNa$ (the other(s) being hydrogen or, as an impurity, $CH_3$) are also present. Preferably at least 80% of the R groups in the mixture are $CH_2PO_3Na_2$ or $CH_2PO_3HNa$ groups.

Similarly, in the diethylenetriamine derivatives, the penta(methylenephosphonate) usually accounts for from 60 to 80% of the total weight of the derivative, the remainder being mostly the tri(methylenephosphonate) with a small amount of the tetra(methylenephosphonate). Preferably at least 65% of the R groups in the mixture are $CH_2PO_3Na$ or $CH_2PO_3HNa$ groups.

The water-insoluble silicate can be an aluminosilicate, preferably a clay, especially a clay of the smectite or kaolinite type. The former include alkali and alkaline earth metal montmorillonites, saponites and hectorites, and the latter include kaolinite itself, calcined kaoline and metakaolin.

The water-insoluble silicate, including aluminosilicate, preferably has an original average particle size (as measured by sieve screening) within the range of about 0.5 to about 50 micrometers; but in the coated granules of the invention the particles are generally agglomerated. Such coated granules of the invention preferably are of an average particle size of at least about 50 micrometers; in some cases a preferred minimum mean particle size is about 150 micrometers; in other cases an optimum mean particle size is often in the range of about 400 to about 500 micrometers; in most cases it is preferred that particle size be no greater than about 600 micrometers.

In the granules of this invention, the ratio on a dry weight basis of aminomethylenephosphonate coating to silicate can, for example, range from about 1:0.5 to about 1:10, for instance from about 1:1 to about 1:10, a preferred range being from 1:1 to about 1:4, more preferably from about 1:1.5 to about 1:4. It has been observed that the storage stability of the product improves as the amount of silicate increases, up to a certain level beyond which no significant further improvement occurs. This maximum effective ratio varies according to the particular silicate being used, but is often found to be between about 1:2 and about 1:3.

The coating of the granules of this invention may contain additional ingredients, provided that such ingredients have no adverse effects on the use for which the granules are intended. A principal use envisaged for the granules of the invention is as a component of dry detergent formulations. If desired, therefore, other ingredients conventionally included in such detergent formulations (other than peroxygen compounds and peroxy compound precursors as indicated above) can be present in such coatings. These optional other ingredients include surfactants, particularly anionic and nonionic surfactants; various inorganic alkali metal salts, for example carbonates, borates, phosphates, polyphosphates, metaphosphates and sulphates; organic builders, for example nitrilotriacetates and polycarboxylates; and thickeners, for example carboxymethylcellulose. The total amount of any such additional ingredients is preferably not greater than twice the amount of the silicate or aluminosilicate component.

The granules of this invention are usually prepared by spray-drying a slurry of the components at a conventional spray-drying temperature, for example within the range 200°–350° C., with conditions adjusted to give the required particle size and moisture content. The latter is desirably as low as possible. The moisture content tends to increase slowly on storage, so that typically a commercial composition may have a moisture content within the range of about 5–10 percent by weight.

In the following examples coated granules of this invention were prepared by forming a slurry from the components shown in the tables below with, if necessary, sufficient water to give approximately 55% by weight of solids in the slurry. The slurry was then spray dried to provide coated granules of substantially water-insoluble silicate.

China clay, as used in the following examples, describes a water-washed product, prepared from hydrothermally modified granite found in southwest England. It is mainly a hydrated aluminum silicate with the approximate formula $Al_2O_3.2SiO_2.2H_2O$, and mineralogically it is composed of kaolinite with minor amounts of micaceous minerals, felspar and quartz. Westone and Bentonite A.S. are smectite clay supplied by English China Clays.

EXAMPLE 1

A slurry, having the composition indicated in Table 1, was spray dried to provide aminomethylenephosphonate-coated silicate granules. The spray-dried coated granules comprised the sodium aminomethylenephosphonates, clay and sodium sulphate in the approximate proportions by weight 1.3:2:1.

TABLE 1

| Slurry Component | Weight Parts |
| --- | --- |
| Sodium salt of ethylenediaminetetra (methylene phosphonic acid), mainly pentasodium salt. 33% by weight aqueous solution. | 27 |
| Sodium salt of diethylenetriaminepenta(methylenephosphonic acid), mainly the heptasodium salt. Approx. 33% by weight aqueous solution. | 54 |
| China clay. 70% by weight slurry in water. | 59 |
| Anhydrous sodium sulphate. | 20 |

EXAMPLE 2

A slurry, having the composition indicated in Table 2, was spray-dried to provide aminomethylenephosphonate-coated silicate granules. The spray-dried coated granules comprised the sodium aminomethylenephosphonates, clay and sodium sulphate in the approximate proportions of weight 1.3:2:1.

TABLE 2

| Slurry Component | Weight Parts |
| --- | --- |
| Sodium salt of ethylenediaminetetra (methylenephosphonic acid), mainly the pentasodium salt. 33% weight aqueous solution. | 81 |
| China clay. 70% by weight aqueous slurry. | 59 |
| Anhydrous sodium sulphate. | 20 |

EXAMPLE 3

A slurry, having the composition indicated in Table 3, was spray-dried to provide an aminomethylenephosphonate-coated silicate granule. The spray-dried coated granules comprised the sodium aminomethylenephosphonate, clay and sodium sulphate in the approximate proportions by weight 1.3:2:1.

TABLE 3

| Slurry Component | Weight Parts |
| --- | --- |
| Sodium salt of diethylenetriaminepenta(methylenephosphonic acid), mainly the heptasodium salt. Approx. 25% by weight aqueous solution. | 81 |
| China clay. 70% by weight aqueous slurry. | 59 |
| Anhydrous sodium sulphate. | 20 |

EXAMPLE 4

This example illustrates the preparation of detergent compositions according to this invention.

In four separate preparations, 12.5 g, 25 g, 50 g and 75 g, respectively, of Bentonite A.S. were added to 100 g of a 33% by weight aqueous solution of the sodium salt of ethylenediamine tetra(methylenephosphonic acid), mainly the pentasodium salt. Each slurry was diluted with distilled water to a total volume of 400 ml and spray-dried. The coated granules obtained by spray-drying had weight ratios of aminomethylenephosphonate (expressed as the equivalent of active acid) to silicate ("phosphonated silicate") of 1:0.5, 1:1, 1:2 and 1:3 respectively. One part by weight of the sodium salt of ethylenediamine tetra(methylenephosphonic acid) is equivalent to approximately 0.65 parts by weight of active ethylenediamine tetra(methylenephosphonic acid).

A detergent formulation was prepared having the following composition:

| Ingredient | % by Weight |
| --- | --- |
| Sodium tripolyphosphate | 20 |
| Sodium perborate tetrahydrate | 20 |
| Tetraacetylethylenediamine | 2 |
| IEC Standard Test Detergent | 58 |

IEC Standard Test Detergent as used in this example, has a prescribed formulation as indicated in Table 4.

TABLE 4

| IEC Standard Test Detergent (1976 Formulation) | |
| --- | --- |
| Component | % by Weight |
| Sodium Alkylbenzenesulfonate (N = 11.5) | 17.5 |
| Tallow Alcohol Etoxylate (14 EO) | 6.2 |
| Sodium Soap | 7.5 |
| Sodium Silicate (SiO2:NAO = 3.3) | 16.1 |
| Magnesium Silicate | 4.1 |
| CMC | 2.6 |
| EDTA | 0.43 |
| Optical Brightener | 0.3 |
| Sodium Sulfate | 45.6 |

TABLE 4-continued

| IEC Standard Test Detergent (1976 Formulation) | |
|---|---|
| Component | % by Weight |
| | 100 |

To separate samples of the above detergent formulation, there was added sufficient quantity of one of the spray-dried granules described above to provide 1% by weight, based on the total weight of the detergent formulation, of sodium ethylenediamine tetra(methylenephosphonate) expressed as the equivalent of active acid.

To investigate the stability of the formulation thus prepared, samples were placed in 100 ml open jars and stored for 60 hours at 40° C. and 80% relative humidity. The samples were then analyzed for residual ethylenediaminetetra(methylenephosphonate) using an ion chromatography technique. As control, a formulation containing spray-dried sodium ethylenediaminetetra(methylenephosphonate) without clay, was employed. The beneficial effect of the clay in stabilizing the phosphonate is apparent from the results of the analysis shown in Table 5. Residual phosphonate is expressed as a percentage of the phosphonate originally present before storage.

TABLE 5

| Coated Granule (Phosphonate/Silicate)* | Residual Phosphonate (percent) |
|---|---|
| 1:0.5 | 35 |
| 1:1 | 45 |
| 1:2 | 80 |
| 1:3 | 80 |
| Control | 7 |

*Aminomethylenephosphonate expressed as the equivalent of active acid.

EXAMPLE 5

Stability tests were carried out on detergent formulations prepared as described in Example 4 with spray-dried coated granules containing sodium ethylenediaminetetra(methylenephosphonate) and various silicates (indicated in Table 6) in a weight ratio (the phosphonate being expressed as the equivalent of active acid) of 1:2. The samples were stored overnight at 50° C. and 80% relative humidity and then analyzed for residual phosphonates. The beneficial effect of the silicate in stabilizing the phosphonate is apparent from the results of the analysis shown in Table 6.

TABLE 6

| Silicate | Residual Phosphonate (percent) |
|---|---|
| None | 0 |
| Westone (Smectite) | 60 |
| Bentonite A.S. (Smectite) | 75 |
| Kaolinite 1 | 80 |
| Kaolinite 2 | 70 |

While the invention has been described herein with regard to certain specific embodiments it is not so limited. It is to be understood that variations and modifications thereof may be made by those skilled in the art without departing from the spirit and scope of the invention.

What is claimed is:

1. Aminomethylenephosphonate-coated granules of a substantially water-insoluble aluminosilicate having a layered sheet structure wherein said granules have a coating essentially devoid of peroxygen compounds and peroxygen compound precursors consisting essentially of aminomethylenephosphonates having as a major component alkali metal salts of aminomethylenephosphonic acid of the formula

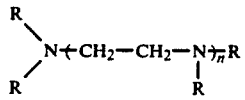

where R is H, $CH_2PO_3H_2$, $CH_2PO_3HM$ or $CH_2PO_3M_2$; M is alkali metal; and n is 0 or an integer from 1–4; and the ratio on a dry basis of aminomethylenephosphonate to silicate is from 1:0.5 to 1:10.

2. The granules of claim 1 wherein an average of at least one-half of R is $CH_2PO_3HM$ or $CH_2PO_3M_2$.

3. The granules of claim 2 wherein said aluminosilicate is a kaolinite or smectite clay.

4. The granules of claim 3 further including an inorganic alkali metal salt.

5. The granules of claim 4 wherein said salt is sodium sulphate.

6. The granules of claim 3 wherein said aminomethylene phosphonate is a sodium salt and n is 0 or 1.

7. The granules of claim 6 wherein ratio of aminomethylenephosphonate to silicate is on a dry weight basis in the range of about 1:1 to about 1:4.

8. The granules of claim 7 wherein the average particle size is in the range of about 50 to about 600 micrometers.

9. Substantially water-insoluble granular aluminosilicate having a layered structure and having a coating comprising aminomethylenephosphonate having as a major component alkali metal salts of aminomethylenephosphonic acid of the formula

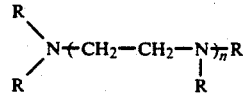

wherein R is H, $CH_2PO_3H_2$, $CH_2PO_3HM$ or $CH_2PO_3M_2$; M is an alkali metal and n is 0 or an integer from 1–4, which coating is essentially devoid of peroxygen compounds and peroxygen compound precursors, and the ratio on a dry basis of aminomethylenephosphonate to silicate is from 1:0.5 to 1:10.

10. Granular silicate to claim 9 wherein said coating comprises alkali metal salts of aminomethylenephosphonic acid.

11. Granular silicate of claim 9 wherein an average of at least one-half of R is $CH_2PO_3HM$ or $CH_2PO_3M_2$.

12. Granular silicate of claim 11 wherein said aluminosilicate is kaolinite or smectite clay.

13. Granular silicate of claim 12 further comprising sodium sulphate.

14. Granular silicate of claim 9 wherein the ratio of aminomethylenephosphonate to silicate is on a dry weight basis in the range of about 1:1 to about 1:4.

15. Granular silicate of claim 14 having an average particle size in the range of about 50 to about 600 micrometers.

16. A dry detergent mixture comprising peroxygen compounds, surfactants and granular silicates according to claim 9.

* * * * *